US012503337B2

(12) United States Patent
Koskinen et al.

(10) Patent No.: US 12,503,337 B2
(45) Date of Patent: Dec. 23, 2025

(54) APPARATUS FOR ACTUATING A SAFETY GEAR ASSOCIATED WITH AN ELEVATOR CAR

(71) Applicant: KONE Corporation, Helsinki (FI)

(72) Inventors: Antti Koskinen, Helsinki (FI); Petri Hartikainen, Helsinki (FI); Pekka Hallikainen, Helsinki (FI); Antti I Mäki, Helsinki (FI)

(73) Assignee: KONE CORPORATION, Helsinki (FI)

( * ) Notice: Subject to any disclaimer, the term of this patent is extended or adjusted under 35 U.S.C. 154(b) by 246 days.

(21) Appl. No.: 17/966,057

(22) Filed: Oct. 14, 2022

(65) Prior Publication Data

US 2023/0032978 A1 Feb. 2, 2023

Related U.S. Application Data

(63) Continuation of application No. PCT/EP2021/062842, filed on May 14, 2021.

(30) Foreign Application Priority Data

May 15, 2020 (EP) .................................... 20174931

(51) Int. Cl.
*B66B 5/22* (2006.01)

(52) U.S. Cl.
CPC ..................................... *B66B 5/22* (2013.01)

(58) Field of Classification Search
CPC ................ B66B 5/22; B66B 5/18; B66B 5/04
See application file for complete search history.

(56) References Cited

U.S. PATENT DOCUMENTS 6,161,653 A * 12/2000 Skalski ..................... B66B 5/04 187/373
6,981,575 B2 1/2006 Barker et al.
(Continued)

FOREIGN PATENT DOCUMENTS

CN 106553948 A 4/2017
DE 102013111385 A1 * 4/2015 ............... B66B 5/18
(Continued)

OTHER PUBLICATIONS

International Search Report, issued in PCT/EP2021/062842, PCT/ISA/210, dated Aug. 17, 2021.
(Continued)

*Primary Examiner* — Minh Truong
*Assistant Examiner* — Michelle M Mudwilder
(74) *Attorney, Agent, or Firm* — Birch, Stewart, Kolasch & Birch, LLP

(57) ABSTRACT

An apparatus for actuating a safety gear of an elevator includes a first stage actuation mechanism; and a second stage actuation mechanism. The second stage actuation mechanism includes a wedge arrangement configured to grip a guiderail associated with the elevator when the first stage actuation mechanism is triggered; a casing including the wedge arrangement and configured for vertical linear movement along the guiderail; and a transmission member coupled to the casing from a first end and to the safety gear from a second end. The apparatus is configured to cause the safety gear to actuate when the first stage actuation mechanism is triggered, the first stage actuation mechanism causing the wedge arrangement of the second stage actuation mechanism to grip the guiderail of the elevator and to decelerate vertical movement of the casing in relation to the guiderail, the deceleration of the casing causing the trans-
(Continued)

mission member to engage the safety gear to the guiderail to stop the elevator.

1 Claim, 2 Drawing Sheets

(56) References Cited

U.S. PATENT DOCUMENTS

| | | | | |
|---|---|---|---|---|
| 7,575,099 | B2 * | 8/2009 | Oh | B66B 5/06<br>187/373 |
| 2002/0117357 | A1 * | 8/2002 | Hugel | B66B 5/22<br>187/373 |
| 2007/0181378 | A1 * | 8/2007 | Kigawa | B66B 5/044<br>187/376 |
| 2011/0088983 | A1 * | 4/2011 | Sirigu | B66B 5/22<br>187/373 |
| 2021/0354956 | A1 * | 11/2021 | Bae | B66B 5/04 |
| 2022/0380176 | A1 * | 12/2022 | Kubo | B66B 5/06 |

FOREIGN PATENT DOCUMENTS

| | | | | |
|---|---|---|---|---|
| EP | 0812796 | A1 | 12/1997 | |
| EP | 2695842 | A1 | 2/2014 | |
| EP | 3147248 | A1 | 3/2017 | |
| JP | 2001-354373 | A | 12/2001 | |
| JP | 4044035 | B2 * | 2/2008 | B66B 13/24 |
| KR | 960003970 | Y1 * | 5/1996 | |
| WO | WO-2012053073 | A1 * | 4/2012 | B66B 5/22 |
| WO | WO 2012/137248 | A1 | 10/2012 | |

OTHER PUBLICATIONS

Written Opinion of the International Searching Authority, issued in PCT/EP2021/062842, PCT/ISA/237, dated Aug. 17, 2021.

* cited by examiner

APPARATUS FOR ACTUATING A SAFETY GEAR ASSOCIATED WITH AN ELEVATOR CAR

CROSS REFERENCE TO RELATED APPLICATIONS

This application is a Continuation of PCT International Application No. PCT/EP2021/062842, filed on May 14, 2021, which claims priority under 35 U.S.C. § 119 (a) to patent application Ser. No. 20174931.4, filed in Europe on May 15, 2020, all of which are hereby expressly incorporated by reference into the present application.

TECHNICAL FIELD

The present application relates to the field of elevator systems, and more particularly to overspeed governing and triggering of an elevator safety gear.

BACKGROUND

Overspeed governors are used to detect when an elevator exceeds a predetermined speed and they act as a stopping mechanism. Typical overspeed governors comprise a sheave coupled to a rope attached to the elevator car. The sheave moves in response to rope movement which indicates of elevator car movement. The overspeed governor may trigger a tripping assembly that actuates a mechanism to stop a governor rope and triggers safety gear to engage to the elevator car for stopping. The safety gear is then reset by moving the elevator car while the governor rope stays static. This will pull wedges of the safety gear from contact with guide rail and the elevator car is free to move again. However, when the overspeed governor is applied in a ropeless solution, the safety gear cannot be reset by utilizing the governor rope. Hence, there is a need for an alternative solution to trigger the safety gear and/or reset the state of elevator safety gear after the safety gear has been triggered.

SUMMARY

It is an objective to provide an apparatus for actuating and/or resetting an elevator safety gear. The objective is achieved by the features of the independent claims. Some embodiments are described in the dependent claims.

According to a first aspect, there is provided an apparatus for actuating a safety gear associated with an elevator car. The apparatus comprises a first stage actuation mechanism; and a second stage actuation mechanism comprising a wedge arrangement configured to grip a guiderail associated with the elevator car when the first stage actuation mechanism is triggered; a casing comprising the wedge arrangement and configured for vertical linear movement along the guiderail; and a transmission member coupled to the casing from a first end and to the safety gear from a second end. In an example, the transmission member is configured to be coupled to the safety gear from the second end. The apparatus is configured to cause the safety gear to actuate when the first stage actuation mechanism is triggered, the first stage actuation mechanism causing the wedge arrangement of the second stage actuation mechanism to grip the guiderail and to decelerate movement of the casing in relation to the guiderail, the deceleration of the casing causing the transmission member to engage the safety gear to the guiderail to stop the elevator car.

In an implementation form of the first aspect, the wedge arrangement comprises two pairs of wedges, each pair comprising a first main wedge and a first counter wedge, the pairs of wedges configured to be placed on opposite sides of the guiderail, and wherein the first stage actuation mechanism, when triggered, is configured to push the first main wedges upwards, and, during the upward motion of the first main wedges, the first counter wedges are configured to cause the first main wedges of the second stage actuation mechanism to move towards the guiderail.

In an implementation form of the first aspect, the first main wedges and the second counter wedges have a larger width at a first end than at a second end, and the first main wedge and the first counter wedge of each pair of wedges are positioned such that the larger width ends are located on opposite directions.

In an implementation form of the first aspect, each of the first counter wedges is associated with a support structure fixed to the casing via a spring, wherein during the upward motion of the first main wedges movement of the first counter wedges is limited by the support structure causing the first main wedges to move towards the guiderail.

In an implementation form of the first aspect, each first main wedge comprises a stopping member configured to prevent the upward movement of the first main wedges when the stopping members come into contact with the support structures.

In an implementation form of the first aspect, the first stage actuation mechanism comprises at least one spring-loaded solenoid coupled to the first main wedges.

In an implementation form of the first aspect, the apparatus is configured to be positioned between the guiderail and a sling of the elevator to provide a limited amount of vertical movement in relation to the sling.

In an implementation form of the first aspect, the apparatus is further configured to release the first main wedges of the second stage actuation mechanism and the safety gear from contact with the guiderail in response to deactivation of the first stage actuation mechanism and an upward movement of the elevator car.

In an implementation form of the first aspect, the apparatus is coupled to a synchronization mechanism for enabling a simultaneous actuation of another safety gear on the other side of the elevator car.

In an implementation form of the first aspect, the synchronization mechanism comprises at least one synchronization rod and at least one lever member coupled between the casing of the apparatus and the safety gear on the other side of the sling, the synchronization mechanism configured to transmit a change in a position of the casing in relation to the elevator sling to the other side of the sling, the change in position causing the other safety gear to actuate.

In an implementation form of the first aspect, the safety gear comprises two pairs of wedges, each pair comprising a second main wedge and a second counter wedge, the two pairs of wedges configured to be placed on opposite sides of the guiderail; and wherein the transmission member is coupled to each second main wedge of the safety gear such that increasing distance of the casing with the transmission member from the safety gear causes the transmission member to pull the second main wedges of the safety gear upwards in relation to the second counter wedges of the safety gear, and, during the upward motion of the second main wedges, the second counter wedges are configured to cause the second main wedges to move towards the guiderail.

In an implementation form of the first aspect, the apparatus and the safety gear comprise like wedge arrangements, and the wedge arrangement of the apparatus is in a smaller scale than the wedge arrangement of the safety gear.

According to a second aspect, there is provided an elevator safety system comprising an elevator safety gear coupled to an apparatus according to the first aspect.

According to a third aspect, there is provided an elevator safety system comprising a safety gear coupled to an apparatus of the first aspect.

In an implementation form of the third aspect, the elevator safety system further comprises a synchronization mechanism, wherein the apparatus is coupled to the synchronization mechanism for enabling a simultaneous actuation of another safety gear on the other side of the elevator car.

In an implementation form of the third aspect, the synchronization mechanism comprises at least one synchronization rod and at least one lever member coupled between the casing of the apparatus and the safety gear on the other side of the sling, the synchronization mechanism configured to transmit a change in a position of the casing in relation to the elevator sling to the other side of the sling, the change in position causing the other safety gear to actuate.

In an implementation form of the third aspect, the safety gear comprises two pairs of wedges, each pair comprising a second main wedge and a second counter wedge, the two pairs of wedges configured to be placed on opposite sides of the guiderail; and wherein the transmission member is coupled to each second main wedge of the safety gear such that increasing distance of the casing with the transmission member from the safety gear causes the transmission member to pull the second main wedges of the safety gear upwards in relation to the second counter wedges of the safety gear, and, during the upward motion of the second main wedges, the second counter wedges are configured to cause the second main wedges to move towards the guiderail.

In an implementation form of the third aspect, the apparatus and the safety gear comprise like wedge arrangements, and the wedge arrangement of the apparatus is in a smaller scale than the wedge arrangement of the safety gear.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The solution illustrated in this description may enable actuation and/or resetting of a safety gear associated with an elevator car when conventional overspeed governor with a governor rope is not in use. The actuation and/or resetting of the safety gear may be implemented with a two-stage actuation apparatus coupled to the adjacent safety gear. According to an embodiment, one stage of the stopping mechanism of the apparatus may be similar to the elevator safety gear, but in a smaller scale. The apparatus may further comprise an electronic actuation stage and a mechanical actuation stage, and a transmission member to transmit the actuated stopping event to the safety gear. The apparatus may be configured to provide fast and reliable operation for actuating the safety gear when needed. For synchronization of the operation of multiple safety gears, an electronic or a mechanical design may be provided such that safety gears on both sides of the elevator car are actuated substantially simultaneously.

Figure 1:
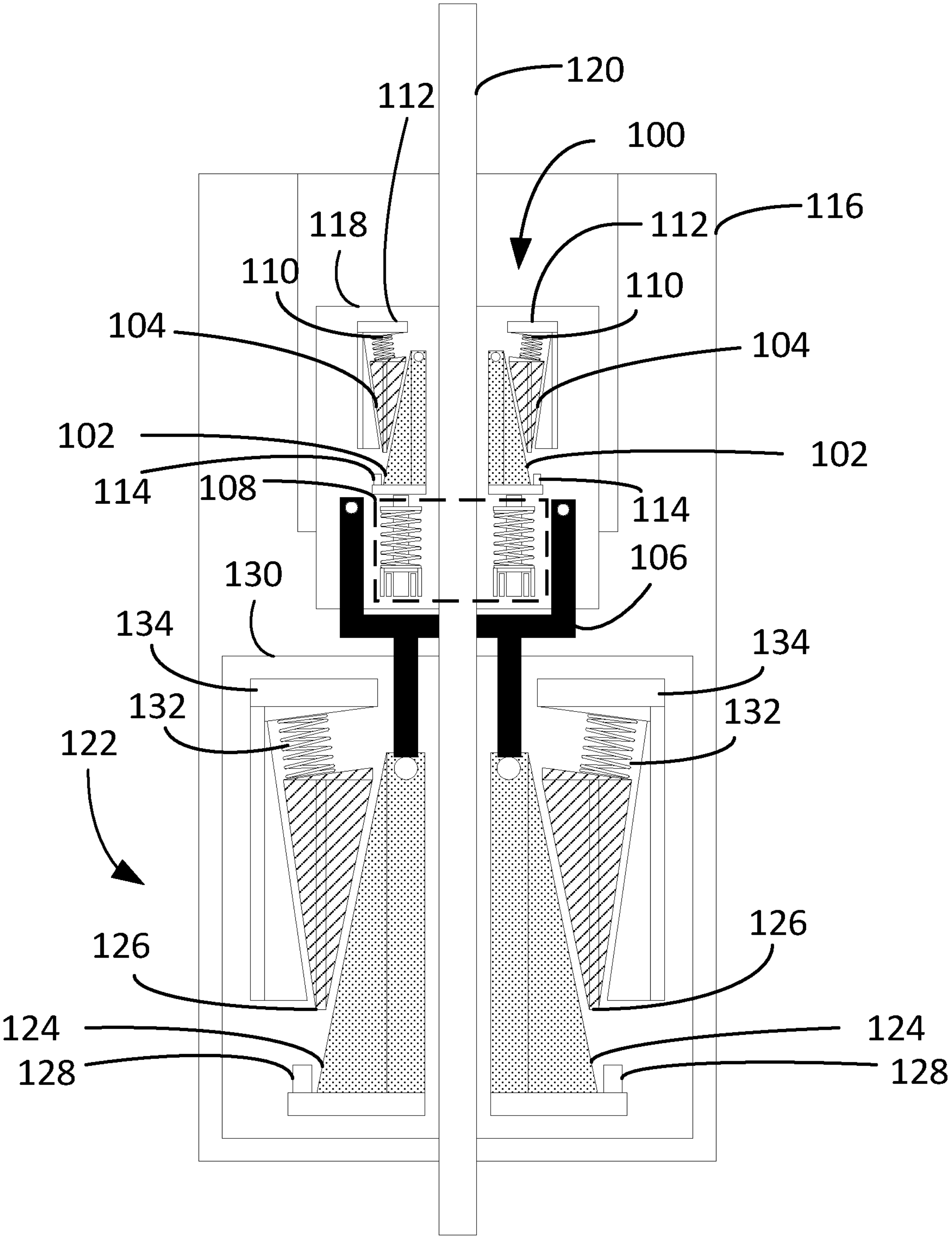
FIG. 1 illustrates an apparatus for triggering safety gear of an elevator according to an example embodiment.

FIG. 1 illustrates an apparatus 100 for actuating a safety gear 122 associated with an elevator car according to an example embodiment. In FIG. 1, the apparatus 100 is coupled to the safety gear 122 such that the apparatus 100 is located above the safety gear 122. In other embodiments, the apparatus 100 may be located differently with respect to the safety gear 122. The safety gear 122 may be attached to a sling 116 of the elevator car. The apparatus 100 may actuate the safety gear 122 when the elevator is travelling downwards and when an abnormal operation is detected, such as an overspeed situation of the elevator car.

The apparatus 100 comprises a set of wedges 102, 104 configured to generate the force required to actuate the safety gear 122 when an overspeed situation is detected. The apparatus 100 may comprise two pairs of wedges, each pair comprising a main wedge 102 and a counter wedge 104. One pair of wedges 102, 104 may be configured on either side of a guiderail 120 associated with the elevator car. Each of the wedges 102, 104 may have a larger width on one end and a smaller width on the other end, such that a wedge-shape is formed. The main 102 and counter wedges 104 may be positioned such that their inclined sides are facing each other, and the larger width ends of the wedges 102, 104 are on opposite vertical directions. The wedge arrangement 102, 104 of the apparatus 100 may be like a wedge arrangement 124, 126 of the safety gear 122, but in a smaller scale, for example, 1:4 or 1:2. In order to help to distinguish different components in FIG. 1, the main wedges 102, 124 of the apparatus 100 and the safety gear 122 are illustrated with a dotted filling and the counter wedges 104, 126 with a diagonal stripe filling.

Each counter wedge 104, 126 may comprise a support structure 112, 134 and a spring 110, 132. The support structures 112, 134 may be fixed in the casing 118, 130.

The counter wedges 104 may be coupled to the support structures 112, 134 via the springs 110, 132. During an upward motion of the main wedges 102, movement of the counter wedges 104 is limited by the support structure 112 causing the main wedges 102 to move towards the guiderail. Each main wedge 102, 124 may comprise a stopping member 114, 128 to limit the upward movement of the main wedge 102, 124. For example, when actuated, the main wedges 102 may be pushed up until the stopping members 114 meet the fixed support structures 112.

The casing 130 of the safety gear 122 may be attached to the sling 116 such that vertical movement with respect to the sling 116 is not allowed. The casing 118 of the apparatus 100 may be attached to the sling 116 such that limited vertical movement is allowed for the casing 118 with respect to the sling 116. For the two-stage safety gear actuation, the main wedges 104 of the apparatus 100 may be coupled to an actuation mechanism 108. The actuation mechanism 108 may be attached to the casing 118 of the apparatus 100, and the main wedges 102 may be movably coupled to the actuation mechanism 108. The actuation mechanism 108 is surrounded with a dashed line in FIG. 1. The actuation mechanism 108 may be, for example, a spring-loaded solenoid. The spring-loaded solenoid may be coupled to each main wedge 102 such that the main wedges 102 are pushed upwards in response to the solenoids extending and touching the casing 118 of the apparatus 100. In response to the upward movement of the main wedges 102, the counter wedges 104 push the main wedges 102 into contact with the guiderail 120, and the casing 118 decelerates in relation to the guiderail 120. If individual solenoids are coupled to each main wedge 102, the solenoids may be controlled simultaneously.

The apparatus 100 may be coupled to the safety gear 122 via a transmission member 106, which is marked as a solid black component in FIG. 1. The transmission member 106 is attached to the casing 118 of the apparatus 100 from a first end of the transmission member 106. The transmission member 106 may be attached, for example, to a bottom of the casing 118. A second end of the transmission member 106 may be attached to the main wedges 124 of the safety gear 122. For example, the safety gear 122 may comprise the two pairs of wedges 124, 126, each pair comprising the main wedge 124 and the counter wedge 126. One pair of wedges 124, 126 may be configured on either side of a guiderail 120 of the elevator. In an embodiment, the second end of the transmission member 106 may be attached to an upper end of the main wedges 124 of the safety gear 122. The transmission member 106 may be in contact only with the main wedges 124 of the safety gear 122 and it may not be attached to the casing 130 of the safety gear. This way, the apparatus 100 may actuate the safety gear 122 via the main wedges 124. When the safety gear 122 and the apparatus 100 are coupled via the transmission member 106, the casing 118 of the apparatus 100 may move relative to the casing 130 of the safety gear 122. The apparatus 100 may be positioned, for example, above the casing 130 of the safety gear 122. Further, the apparatus 100 may not be in contact with the guiderail 120 when it is not triggered. When the casing 118 of the apparatus 100 decelerates and the casing 130 of the safety gear 122 continues its vertical movement, the stopping mechanism of the elevator car may proceed. The transmission member 106 may pull the main wedges 124 of the safety gear 122 upwards in relation to the counter wedges 126 of the safety gear 122. The main wedges 124 may then rise until the stopping members 128 of the main wedges 124 are in contact with the support structures 134 of the counter wedges 126 and block further upward movement of the main wedges 124. The support structures 134 may be fixed to the casing 130 of the safety gear 122. Simultaneously with the relational upward movement of the main wedges 124, the counter wedges 126 may cause movement of the main wedges 124 towards the guiderail 120. Eventually the main wedges 124 grip the guiderail 120, which causes the elevator to stop.

The safety gear 122 may be disengaged by deactivating the actuation mechanism 108. For example, when current to the solenoid is cut off, the spring associated with the actuation mechanism 108 may return the actuation mechanism 108 to its initial position. After the current is cut off, the elevator sling 116 may be moved upwards by an elevator motor. When the actuation mechanism 108 is reset and the elevator sling 116 is lifted, the main wedges 102 of the apparatus 100 and the main wedges 124 of the safety gear 122 may come loose from the guiderail 120. In an embodiment, the actuation and resetting of the apparatus 100 may be performed the other way around, that is, actuated by cutting off current to the spring-loaded solenoid, and reset by providing current to the spring-loaded solenoid. The operations for causing the elevator to stop may be repeated by triggering the actuation mechanism 108 again. Similarly, the safety gear 122 may be disengaged by deactivating the actuation mechanism 108 and elevating the elevator sling 116. When the elevator sling 116 is lifted, also the attached casing 130 of the safety gear 122 lifts while the main wedges 124 may remain vertically static. Hence, the linear vertical distance between the counter wedges 126 and the main wedges 124 of the safety gear 122 increases, and the pressure towards the guiderail 120 via the counter wedges 126 ends. Thereby, the main wedges 124 of the safety gear 122 may come loose from gripping the guiderail 120. Exploitation of the solenoid or solenoids may enable a very fast response for triggering the safety gear 122. Although the spring-loaded solenoid is illustrated in detail as the actuation mechanism 108, in other example embodiments also other mechanisms are possible.

As an example of an operation of the apparatus 100, the elevator is travelling downwards. Because the safety gear housing 130 with the safety gear 122 of the elevator is attached to the sling 116 of the elevator car, the apparatus 100 travels downwards in tandem with the safety gear 122. Thereafter, an overspeed situation is detected by an overspeed governor. The overspeed governor may trigger the first stage actuation mechanism 108 of the apparatus 100. Consequently, the wedge arrangement 102, 104 of the second stage actuation mechanism, of the apparatus 100, causes the casing 118 with the transmission member 106 to decelerate and distance itself from the safety gear 122. The main wedges 124 of the safety gear 122 are pulled up by the transmission member 106 while the safety gear 122 with the counter wedges 126 continues to travel downwards with the sling 116, until the main wedges 124 of the safety gear 122 have reached their upmost position, where the upward motion of the wedges is prevented by the stopping members 128 and the main wedges 124 have gripped the guiderail 120

The apparatus 100 may provide a reliable solution for actuating and/or resetting elevator safety gears in ropeless overspeed governor systems. Actuation of the safety gear by a set of similar but smaller wedges may ensure that a sufficient force and speed to lift the main wedges of the safety gear is provided. In addition, the design of the apparatus 100 is simple and easy to implement. The apparatus 100 may not reserve a lot of space when installed between a guiderail and a sling of an elevator. The simple design may also enable cost effective implementation for triggering the elevator safety gears.

The apparatus 100 for actuating and releasing the safety gear 122 may be provided on both sides of the sling 116 for simultaneous electronic triggering. Alternatively, a synchronization mechanism may be used to transmit the actuation from one side of the sling to the safety gear 122 on the other side.

Figure 2A:
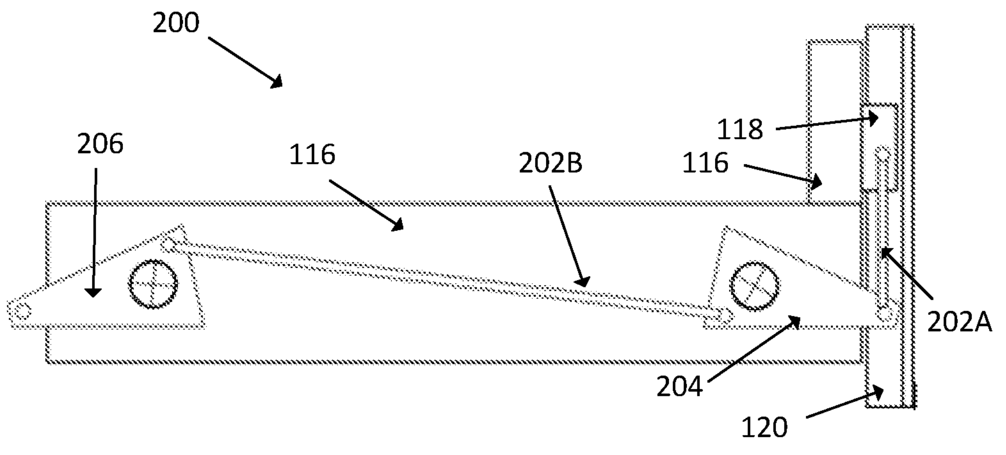
FIG. 2A illustrates a synchronization mechanism coupled to an apparatus for actuating a safety gear of an elevator in a first position according to an example embodiment.
Figure 2B:
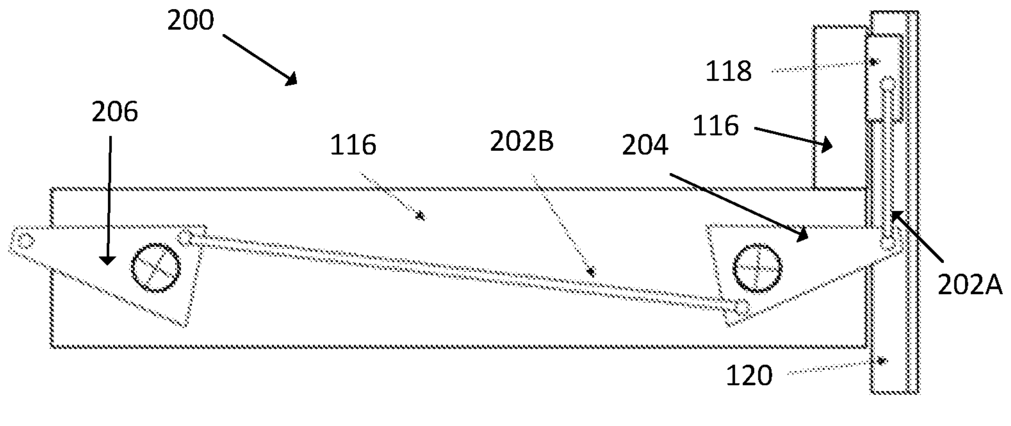
FIG. 2B illustrates a synchronization mechanism coupled to an apparatus for actuating a safety gear of an elevator in a second position according to an example embodiment.

FIGS. 2A and 2B illustrate a synchronization mechanism 200 coupled to an apparatus 100 for actuation of safety gears 122 of an elevator according to an example embodiment. FIG. 2A illustrates the synchronization mechanism 200 in a first position and FIG. 2B in a second position. The implementation enables transmitting the movement of the apparatus 100 to another safety gear 122 located on the other side of the elevator in addition to the safety gear 122 to which it is operatively coupled to. The safety gears 122 on both sides of an elevator sling 116 are identical. The synchronization may enable that only one apparatus 100 needs to be installed in order to actuate both safety gears 122 associated with the elevator car.

The synchronization mechanism 200 may comprise one or more synchronization rods 202A, 202B and lever members 204, 206 to synchronize actuation of the safety gears 122 of the elevator. The safety gears 122 are omitted from the FIGS. 2A, 2B. The synchronization mechanism 200 may comprise two identical lever members 204, 206 for transmitting the movement of the apparatus 100 from one side of the sling 116 to the other side of the sling 116 via the synchronization rods 202A, 202B. The lever members 204, 206 may the attached to the sling 116 via shafts. The circles with crosslines in the lever members 204, 206 illustrate rotational positions of the shafts of the lever members 204, 206.

A first synchronization rod 202A may be coupled to a casing 118 of the apparatus 100 from one end. The first synchronization rod 202A may be movably coupled to a first lever member 204 from a second end of the synchronization rod 202A such that rotational movement of the first lever member 204 is allowed. Hence, changes in position of the casing 118 in relation to the sling 116 may cause the first lever member 204 to rotate. A second synchronization rod 202B may be coupled between the first lever member 204 and the second lever member 206 located on the other side of the sling 116 than the first lever member 204. The second synchronization rod 202B may be movably attached to a lower part of the first lever member 204 and to an upper part of the second lever member 206. The attaching arrangement may enable that rotational movements of the lever members 204, 206 mirror each other. In an example embodiment, the synchronization rod 202A, a rod extending downwards from the connection point of the synchronization rod 202A and the first lever member 204 to the main wedges 124 of the safety gear and a rod extending downwards from the second lever member to the main wedges 124 of another safety gear may be part of the transmission member 116.

In FIG. 2A, the elevator car may be in a normal operation and moving downwards. The lever members 204, 206 are in their initial position. In FIG. 2B, the apparatus 100 may have triggered in response to a detected overspeed situation. The casing 118 of the apparatus 100 may have decelerated in response to the wedges 102 inside the casing gripping a guiderail 120. The deceleration of the casing 118 may have further caused the safety gear 122 of the elevator operatively coupled to the apparatus 100 to grip the guiderail 120 and bring the elevator sling 116 to a stop. The deceleration of the casing 118 causes its position in relation to the sling 116 to change, which results in a change in the position of the lever members 204, 206 coupled to the casing 118 via the synchronization rods 202A, 202B. The safety gear 122 on the other side on the sling 116 than the apparatus 100 may actuate in response to the caused changes in rotational positions of the lever members 204, 206.

For resetting the actuator 100 and releasing the safety gear 122 from gripping, the sling 116 is lifted to move the safety gear housing 130 and actuator housing 118 upwards to release the main wedges 102 and 124 of the actuator 100 and safety gear 122, returning the lever members 204, 206 to their initial position.

Providing the actuator 100 on both sides with simultaneous electronic triggering is one implementation alternative. Providing a single actuator 100 with synchronization mechanism 200 is another. A simple, reliable and fast activation and reset of safety gears can be achieved by both alternatives.

While there have been shown and described and pointed out fundamental novel features as applied to preferred embodiments thereof, it will be understood that various omissions and substitutions and changes in the form and details of the devices and methods described may be made by those skilled in the art without departing from the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator safety system, comprising:
a safety gear;
a first stage actuation mechanism; and
a second stage actuation mechanism, the second stage actuation mechanism comprising:
a wedge arrangement configured to grip a guiderail associated with the elevator car when the first stage actuation mechanism is triggered;
a casing comprising the wedge arrangement and configured for vertical linear movement along the guiderail and
a transmission member having a first end coupled to the casing and a second end coupled to the safety gear,
wherein the safety gear is configured to actuate when the first stage actuation mechanism is triggered, the first stage actuation mechanism causing the wedge arrangement of the second stage actuation mechanism to grip the guiderail and to decelerate vertical movement of the casing in relation to the guiderail and the deceleration of the casing causing the transmission member to engage the safety gear to the guiderail to stop the elevator car,
wherein the second stage actuation mechanism and the safety gear comprise like wedge arrangements and the wedge arrangement of the second stage actuation mechanism is in a smaller scale than the wedge arrangement of the safety gear.

* * * * *